United States Patent [19]

Latel et al.

[11] Patent Number: 4,825,083
[45] Date of Patent: Apr. 25, 1989

[54] ULTRAVIOLET WATER TREATMENT APPARATUS

[75] Inventors: Ernest Latel, Etobicoke; John A. Johnson, Toronto, both of Canada

[73] Assignee: Arlat Inc., Toronto, Canada

[21] Appl. No.: 192,908

[22] Filed: May 12, 1988

Related U.S. Application Data

[63] Continuation of Ser. No. 872,476, Jun. 10, 1986, Pat. No. 4,757,205.

[51] Int. Cl.$^4$ .............................................. G01N 21/01
[52] U.S. Cl. ...................................... 250/436; 250/435
[58] Field of Search .................. 250/435, 436; 422/24, 422/2

[56] References Cited

U.S. PATENT DOCUMENTS

| | | | |
|---|---|---|---|
| 2,670,439 | 2/1954 | Darney | 250/43 |
| 3,182,191 | 5/1965 | McFarland et al. | 250/43 |
| 3,182,193 | 5/1965 | Ellner et al. | 250/43.5 |
| 3,462,597 | 8/1969 | Young | 422/24 |
| 3,471,693 | 10/1969 | Veloz | 422/24 |
| 3,637,342 | 1/1972 | Veloz | 21/102 R |
| 3,837,800 | 9/1974 | Wood | 21/54 |
| 3,924,139 | 12/1975 | Hirose et al. | 422/24 |
| 3,948,772 | 4/1976 | Ellner | 210/96 R |
| 4,103,167 | 7/1978 | Ellner | 250/432 |
| 4,367,410 | 1/1983 | Wood | 250/436 |
| 4,400,270 | 8/1983 | Hillman | 422/24 |
| 4,482,809 | 11/1984 | Maarschalkeweerd | 250/435 |

FOREIGN PATENT DOCUMENTS

| | | |
|---|---|---|
| 855521 | 11/1952 | Fed. Rep. of Germany . |
| 2213658 | 10/1973 | Fed. Rep. of Germany . |
| 421296 | 2/1911 | France . |
| 434069 | 1/1912 | France . |

Primary Examiner—Bruce C. Anderson
Attorney, Agent, or Firm—Ridout & Maybee

[57] ABSTRACT

An ultraviolet water treatment plant is provided in which individual ultraviolet lamp units are loosely and retractably located within frames supported in a water treatment channel. Individual frames supporting arrays of parallel lamp units may be removed from the channel, and the lamp units may be individually disengaged from the frame and disassembled for lamp replacement. The frames have unitary plug connectors to a power supply arranged so that the plug of a frame must be disengaged from the supply before that frame can be removed from the channel. The level of water in the channel is controlled according to the rate of flow, and the lamp units are selectively energized according to whether they are immersed so as to match the irradiation provided to the rate and cross section of the flow.

3 Claims, 4 Drawing Sheets

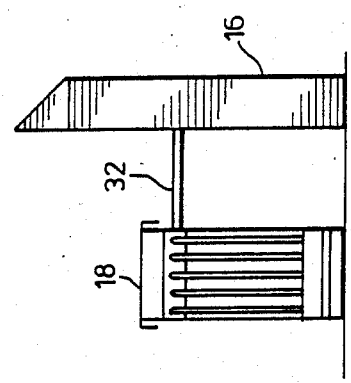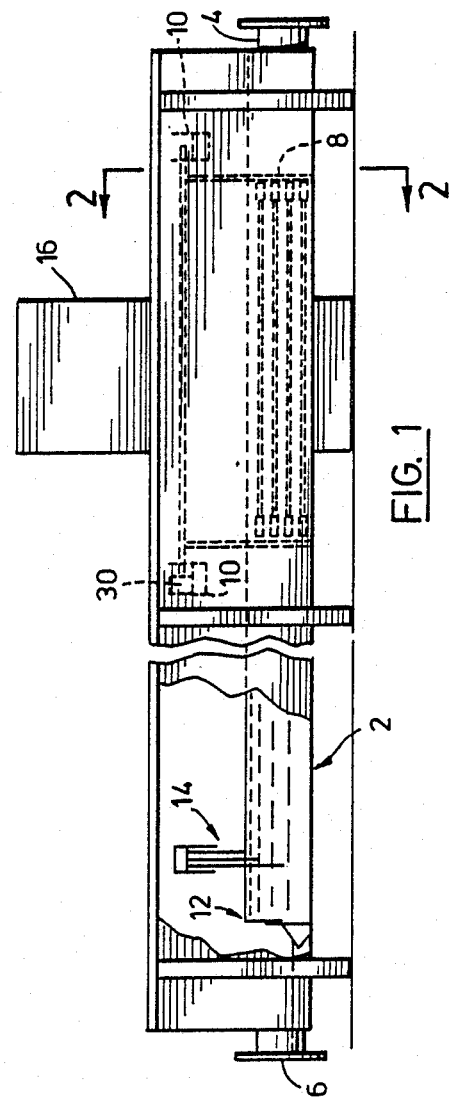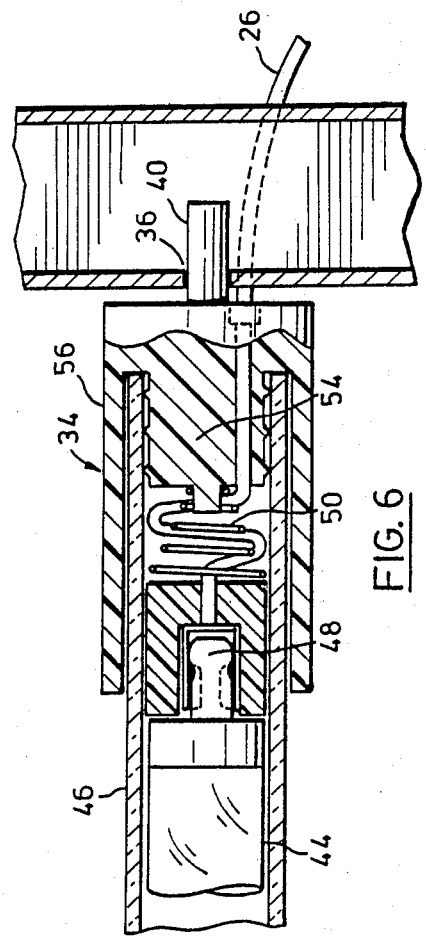

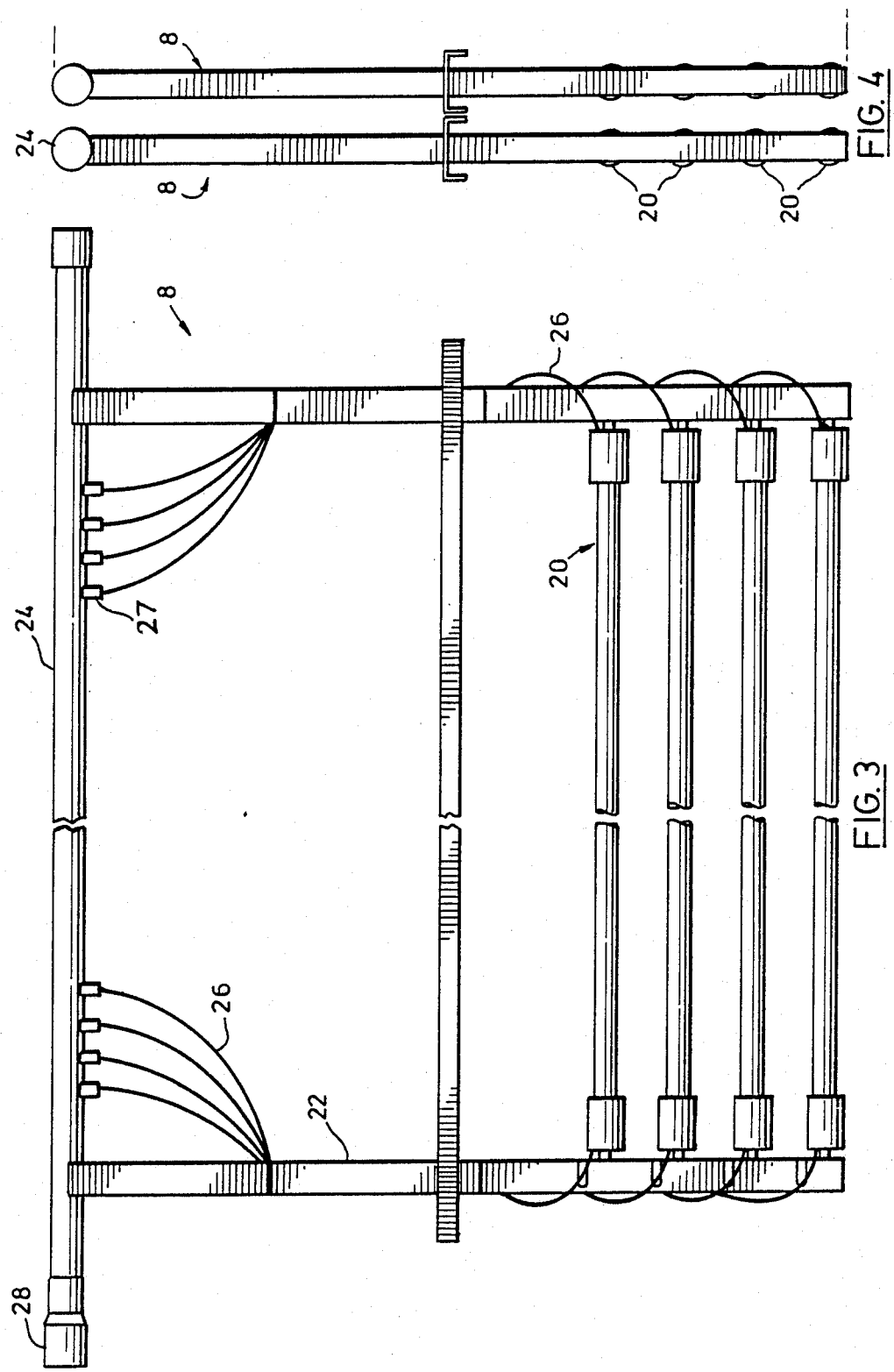

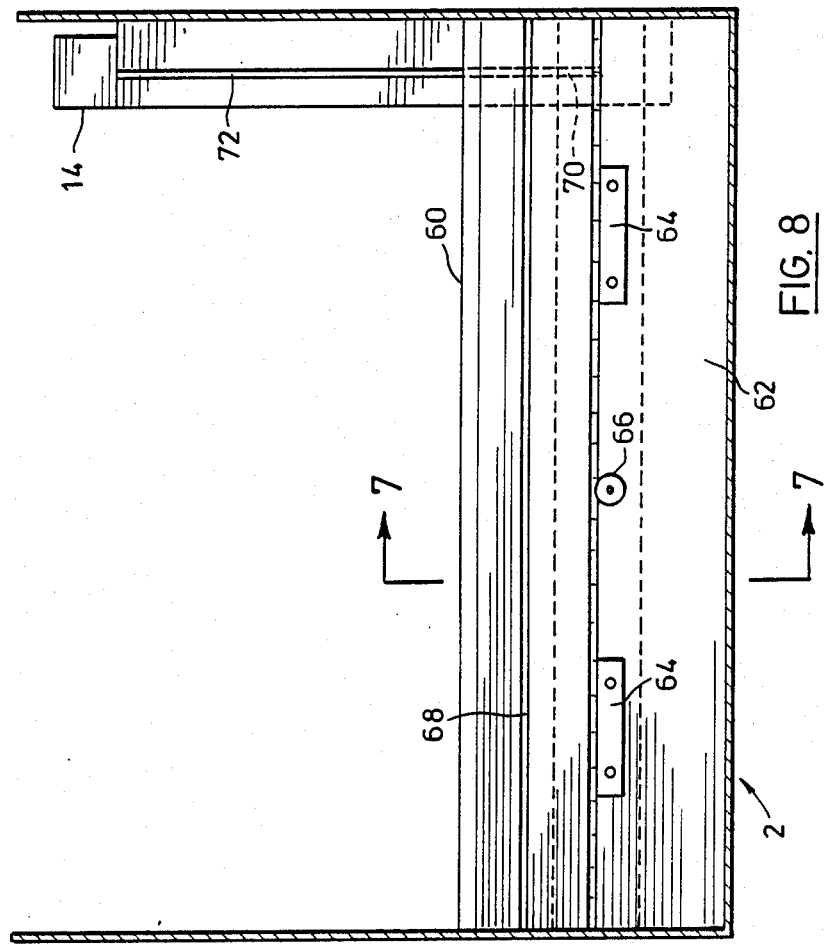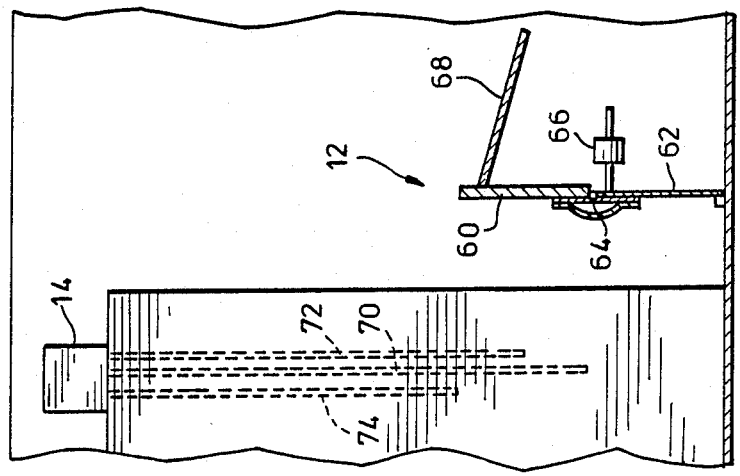

ULTRAVIOLET WATER TREATMENT APPARATUS

This application is a continuation of application Ser. No. 06/872,476, filed June 10, 1986, now U.S. Pat. No. 4,757,205.

FIELD OF THE INVENTION

This invention relates to ultraviolet water purification systems.

BACKGROUND OF THE INVENTION

For many years, the most widely used technique for purifying large quantities of water has been the addition of small quantities of chlorine or chlorine releasing compounds to the water, sufficient to destroy undesirable micro-organisms. Chlorination has however the disadvantages firstly that it tends to render the water less acceptable for drinking or bathing, particularly if the chlorine concentration and pH of the water are not carefully controlled, and secondly that the chlorine may interact with other compounds present in the water to leave low concentrations of possibly harmful chemicals.

It has been known for many years that ultraviolet light at appropriate wavelengths has powerful germicidal properties, and the use of ultraviolet light for water purification purposes has been gaining in popularity in recent years since it avoids the disadvantages associated with chlorination. The problems associated with such treatment are mainly problems of implementation, i.e. ensuring adequate irradiation of large quantities of water in an effective and energy efficient manner, using equipment which is readily and economically maintained.

One type of equipment which has found favour uses a battery of parallel elongated ultraviolet tubes supported on appropriate carrier frames in a channel through which the water to be treated is caused to flow. The spacing of the tubes from each other and from the walls of the channel is such as to minimize the path of the ultraviolet radiation from the tubes through the water. An example of such an arrangement is shown in U.S. Pat. No. 3,948,772.

As the number of tubes utilized in an installation increases, it becomes increasingly essential that adequate provision be made for replacing tubes as and when they fail. One approach to this problem is disclosed in U.S. Pat. No. 4,482,809 (Maarschalkerweerd) issued Nov. 13, 1984. This patent discloses an arrangement in which groups of vertically adjacent tubes are supported in individual rack assemblies which can be withdrawn from a treatment channel for replacement of tubes. In the arrangement described in this patent, the lamps are housed in transparent tubes extending between sockets integral with the side arms of a rigid frame, at least one of the sockets having an end plug through which a lamp can be withdrawn longitudinally once the frame has been withdrawn from the channel. This arrangement is relatively complex to fabricate, and whilst it may appear an advantage that the lamps are rigidly secured in the frame, this entails that any distortion of the frame during handling strains the quartz tubes containing the lamps, thus risking breakage. Furthermore, considerable attention must be paid to leak-proofing, since any leak may penetrate throughout the assembly.

A further problem with such assemblies is that they are commonly required to accommodate widely varying rates of water flow, which means that the degree of irradiation will vary according to the rate of flow unless some means is provided to compensate for this effect.

Finally the use of electrical equipment in a wet environment, and the use of high intensity ultraviolet radiation, poses safety hazards against which the operators of the plant should be protected. In particular, there should desirably be some positive assurance that power is disconnected from the assemblies before they can be removed from the channel, since this both inhibits disassembly in a powered up condition, and ensures that radiation ceases before an assembly is removed.

It is an object of the present invention to tackle the above problems.

In a first aspect, the present invention provides, in a water treatment plant comprising a treatment channel for the passage of water to be treated, at least one array of parallel elongated ultraviolet electric lamp units, means for supporting said at least one array with the channel, and means for connecting said array to an electrical power supply, the improvement wherein each lamp unit in the array comprises an individually watertight assembly of a tubular ultraviolet lamp, a tubular housing for the lamp which is transparent to ultraviolet radiation, and watertight end cap units for the tube, at least one being removable and which establish electrical connections to the lamp, and the lamp units are assembled into arrays by releasably engaging the assembled units between end bars of a frame, said end bars releasably engaging opposite end caps of each assembled unit. Preferably the end bars have series of spaced sockets between which the lamp units are removably located, each end cap of a lamp unit comprising a locating spigot releasably engageable with locating means on an end bar so as to require removal of that end cap from the frame before the lamp unit can be disassembled.

The end bars may be connected by braces extending parallel to the lamp units to provide a frame which may be suspended from spaced hangers of a rack supported above the channel. Preferably the frame mounts a multiple connector plug establishing electrical connections between the lamp and a complementary socket mounted on the rack and connected to the power supply, such that the frame cannot be removed from the rack without withdrawing the plug from the socket. In a preferred arrangement, the frame must be moved horizontally on the rack to disengage the plug from the socket before it can be lifted upwardly from the channel.

The invention also extends to the provision of, in an ultraviolet water treatment plant comprising a treatment channel for the passage of water to be treated, at least one vertically stacked array of elongated ultraviolet electric lamp units, means for supporting said at least one array within the channel, and means for connecting the lamps of said array individually to a power supply, the improvement wherein means are provided to restrict the flow of water through the channel such that the depth of water in the channel, and hence the number of lamps in each said array which are immersed, is progressively increased in accordance with the rate of flow through the channel, means to sense the depth of water in the channel, and switching means associated with said power supply and controlled by said sensing means to turn on only such lamps as are required to irradiate the water.

Preferably the means to restrict the flow of water through the channel comprises a weir assembly comprising an upper barrier portion, spanning the channel, and having an upper edge forming a weir, and a lower sluice portion hingedly suspended from the lower edge of the upper barrier for swinging movement in a downstream direction and biased towards a position in which it closes the channel beneath the upper barrier. As the water level upstream of the weir assembly increases the sluice firstly opens progressively to permit an increasing flow of water, and then the rate of flow through the fully opened sluice increases as the level of water behind the barrier increases. Finally the water pours over the weir at increasing rates as its level further increases.

Further features of the invention will become apparent from the following description of a preferred embodiment with reference to the accompanying drawings.

IN THE DRAWINGS

FIG. 1 is a side elevation of a plant in accordance with the invention;

FIG. 2 is a section on the line 2—2 in FIG. 1;

FIG. 3 is a side elevation on an enlarged scale of a single lamp array;

FIG. 4 is an end elevation showing two arrays as shown in FIG. 2;

FIG. 6 is a sectional view of an end cap of a lamp unit and adjacent parts;

FIG. 7 is a fragmentary longitudinal section on the line 8—8 in FIG. 8 through a portion of the channel of the plant, showing a level control device; and FIG. 8 is a transverse section through the channel, also showing the level control device.

Figure 5:
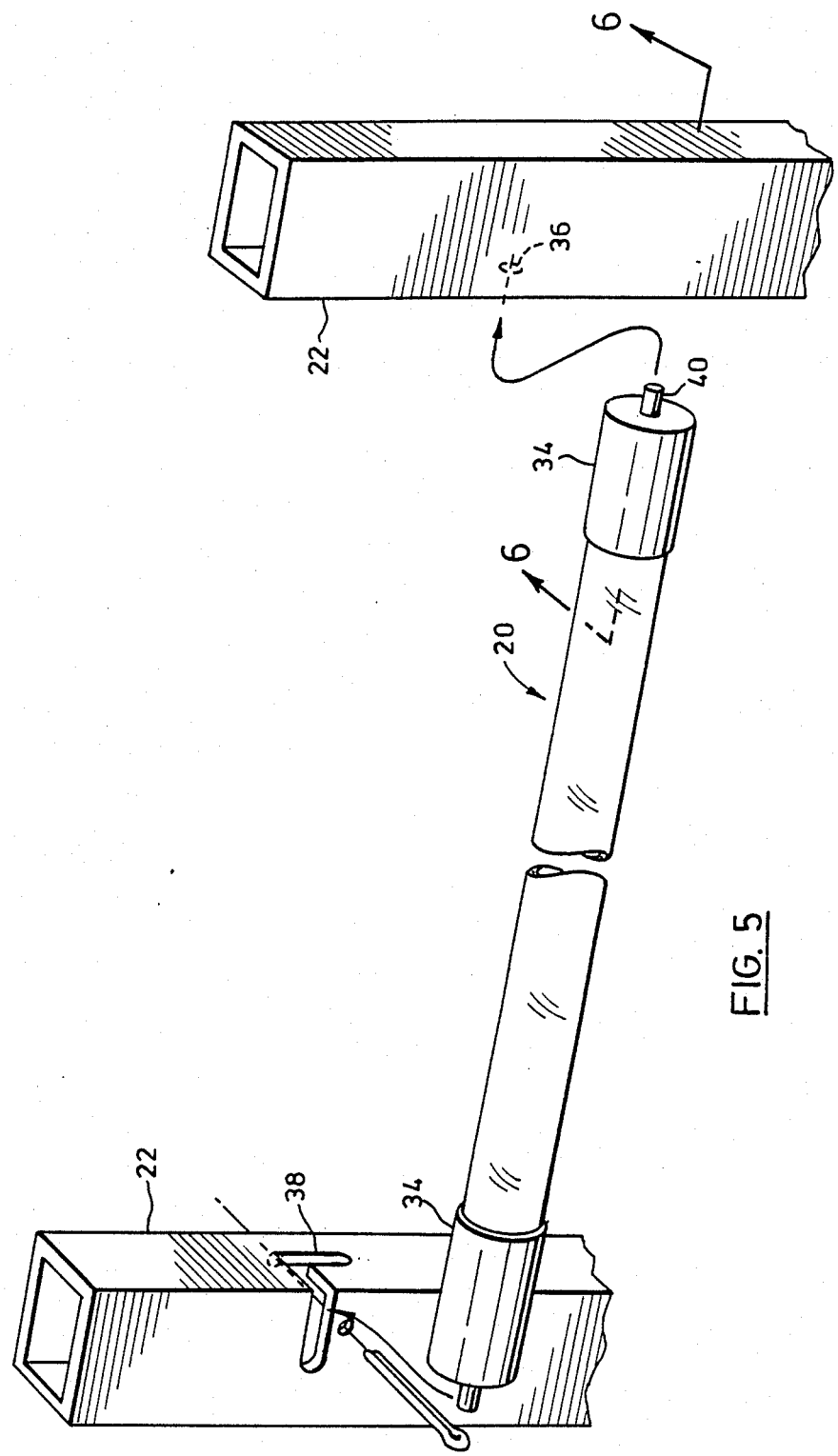
FIG. 5 is a perspective view on an enlarged scale illustrating the mounting of an individual lamp unit to end bars of the array of FIG. 4.

Referring to FIGS. 1 and 2, the apparatus comprises a stainless steel channel 2 having inlet and outlet pipes 4 and 6 at opposite ends and of a capacity sufficient to handle the maximum anticipated flow of water through the apparatus without significant restriction. Although the unit shown is free-standing, it may be more convenient, especially in large units, to form the channel in the ground and provide it with a suitable liner. It is desirable that the liner has a highly reflective surface so as to maximize irradiation effectiveness, and stainless steel is a preferred material because of its ability to maintain a specular surface in potentially corrosive conditions.

Within the channel are located one or more banks (only one is shown) of arrays of ultraviolet lamp units 8 each supported on a rack formed by transverse rails 10. At the downstream end of the channel is a level control system comprising a weir assembly 12 and level sensor assembly 14. A power supply and control console unit 16 is provided adjacent the channel, which is provided with top covers 18 which are removable for maintenance, but normally prevent the escape of ultraviolet radiation or the ingress of foreign matter.

Referring to FIGS. 3 to 5, the individual lamp arrays 8 comprise a number, in this case four, of vertically stacked parallel horizontal tubular lamp units 20 located by end bars 22. The end bars 22 are interconnected by horizontal cross members, of which an upper cross member 24 is tubular and extends outwardly of the bars 22 to provide supports which rest on the rails 10. Flexible insulated wires 26 for the lamp units 20 enter the tubular member 24 and are connected to the pins of a multiple conductor plug 28 mounted on one end of the member 24 so that by bodily longitudinal horizontal movement of the array on the cross members 10, the plug may be moved into or out of engagement with one of an array of sockets 30 (see FIG. 1) connected to the power supply unit 16 by conductors passing through a conduit 32. The lower cross member is positioned above the highest anticipated water level in the channel, and is an inverted channel shaped stainless steel plate which performs the dual function of bracing the frame, and reflecting back into the channel radiation which would otherwise escape upwardly to the detriment of both operating efficiency and the safety of personnel removing lamp arrays for maintenance.

The lamp units 20 are not rigidly attached to the bars 22 of the frame. Instead, the units have end caps 34, described in more detail below, provided with axially outwardly extending spigots 40 which are releasably captive within locating apertures 36 and 38 in the bars 22, as best seen in FIG. 5. One bar 22 is formed with a series of round apertures 32 to receive the spigots 40 at the one ends of the lamp units at appropriate levels. The other bar is formed at corresponding levels with slot like apertures 38 through each of which the spigot 40 at the other end of a lamp unit may be moved upwardly and laterally out of engagement with the bar, after which the spigot 40 at the first end may be moved longitudinally out of engagement with the associated aperture 36. Unintended disengagement of the pin 40 from the slot 28 is prevented by insertion of a split pin 42 through the bar 22 to hold the pin within the downwardly extending portion of the slot. Gravity alone cannot be relied upon to retain the pin in the slot since the lamp units will tend to float once submerged. It should be noted that the bars 22 merely serve to locate the lamp units in their proper position, and once an assembly 8 is removed from the channel (thus interrupting the supply of power to the tubes), the split pin 42 retaining any lamp unit can be remove and one or more ends of the unit withdrawn from the frame to the extent permitted by the flexible supply cables 26; only then can it be disassembled for lamp replacement or other maintenance, since otherwise the spacing between the bars 22 ensures that the end caps must be fully engaged with the remainder of the units. The construction of lamp units is shown in more detail in FIG. 6. The unit comprises a tubular lamp 44 emitting ultraviolet radiation of suitable wavelength, typically 2540 Angstroms, housed within a quartz tube 46 transparent to such radiation and of the type conventionally utilized to protect such lamps. Electrical connection to each end of the tube are established by means of conventional press-on connectors 48 within housing slidable within the tube 46 and urged against the tube by springs 50 mounted on spigots 52 at the inner end of an axially extending core 54 of the end caps 34. Each end cap, which may be moulded in one piece from synthetic plastics material, has an external sleeve 56 surrounding an end of the tube 46 and the core 54 has deformable peripheral ribs which establish a watertight seal to the tube 46. The flexible cable 26 passes through and is sealed to the plug 26 on its way to the cap 48. The lamp 44 may be easily replaced once the lamp unit is removed from the array simply by pulling the end caps 34 off the tube 46 and the connectors 48 off the lamp 44. A new lamp may then be placed in the tube 46 and the caps replaced, prior to re-engaging the re-assembled lamp unit with the bars 22, replacing the lamp array 8 in the channel 2 so that the tubular member 24 rests on the rack formed by the cross members 10, and moving the array longitudinally of the channel to re-engage the plug 28 with the associated socket 30.

The total number of lamp units 20 in the several arrays 8 is of course fixed for any particular installation, but the flow of water to be treated may vary over a wide range. With low rates of flow, operation of the total number of lamp units would lead to unnecessarily high levels of irradiation and resultant waste of energy. In order to mitigate this problem, provision is made to regulate the depth of water in the channel according to the rate of flow so as to immerse differing numbers of lamp units, and to sense the depth so that only those lamps which are immersed will be energized, thus conserving energy and prolonging the life of some of the lamps. The flow of water is regulated by means of the weir assembly 12, and the level of the water within the channel is sensed by the sensor array 14, which are described in more detail with reference to FIGS. 7 and 8.

The weir assembly comprises a barrier 60 spanning the channel and a flap 62 connected to the lower edge of the barrier 60 by hinges 64. The flap is biased to a position closing a gap beneath the barrier 60 by a bias weight 66. A baffle 68 prevents water pouring over the barrier 60 from falling onto the flap 62. When water is flowing through the channel at a low rate, its exit will be restricted by the flap 62 until the water rises to a level sufficient to cause opening of the flap against the bias applied by the weight 66. This level is selected to be high enough to ensure submersion of at least the lowest lamp unit 20 in each array 8, and normally only these units will be energized by the power supply unit 16. As the rate of flow in the channel increases, the flap will open more fully to accommodate the flow until the barrier 60 becomes an obstacle to flow. The level will then rise behind the barrier as the flow rate further increases, until ultimately the water will pour over the weir formed by the top of the barrier. As the water level rises, it will successively contact the bottom of the level sensing probes 70, 72 and 74, each of which will signal to the control and power unit 16 that another lamp unit in each array has been submerged and can be turned on. Thus when the flow through the system is less than a certain minimum, only one in four (in the example shown) of the lamps will be turned on, with additional lamps being switched on as the rate of flow and the cross section of the flow increases, providing for adequate yet economical treatment for a wide range of rates of flow. This feature is particularly valuable in systems for storm water treatment, where rates of flow may vary very widely and rapidly, whilst being minimal or zero for much of the time. An additional sensor to switch the lowest tier of lamp units may of course be provided if conditions require this.

Although not shown, ultraviolet sensing devices are provided in the channel to monitor the radiation level therein and verify that this is sufficient to provide a required degree of sterilization. The passage of current through individual lamps is also monitored so that failed lamps can be detected and then replaced as previously described.

Although in the embodiment described, the lamp units extend longitudinally in a single bank of arrays, other arrangements are possible. Thus two banks could be provided in series to provide enhanced performance, or the arrays could be arranged and supported so that the lamp units extend transversely or vertically in the channel.

Rather than providing for lamp units which can be disassembled on site, the end caps maybe more or less permanently sealed to the quartz tubes, and the cables to the lamp units may be provided with connectors so that the entire unit can be replaced.

We claim:

1. In an ultraviolet water treatment plant comprising a treatment channel for the passage of water to be treated, at least one vertically stacked array of elongated ultraviolet electric lamp units, means for supporting said at least one array within the channel, and means for connecting the lamps of said array individually to a power supply, the improvement wherein means are provided to restrict the flow of water through the channel such that the depth of water in the channel, and hence the number of lamps in each said array which are immersed, is progressively increased in accordance with the rate of flow through the channel, means to sense the depth of water in the channel, and switching means associated with said power supply and controlled by said sensing means to turn on only such lamps as are required to irradiate the water.

2. A water treatment plant, according to claim 1, wherein the means to restrict the flow of water through the channel comprises a weir assembly comprising an upper barrier portion, spanning the channel, and having an upper edge forming a weir, and a lower sluice portion hingedly suspended from the lower edge of the upper barrier for swinging movement in a downstream direction and biased towards a position in which it closes the channel beneath the upper barrier.

3. An ultraviolet-irradiation water treatment plant comprising:
    (a) a channel for the passage of water to be treated, the flow rate of which may vary over a wide range;
    (b) at least one vertical array of generally horizontally elongated ultra-violet lamp units supported within the channel, the number of lamps in the array which are immersed depending on the existing depth of the water in the channel;
    (c) switching means to individually connect each lamp in the array to a power supply, only the lamps which are so connected being activated whereby the amount of power consumed by the array depends on the number of activated lamps;
    (d) adjustable means responsive to the flow rate of the water to restrict the flow of water out of the channel to cause the depth of water therein to rise in accordance with the flow rate; and
    (e) means to sense the depth of water in the channel to cause the switching means to activate only those lamps which are immersed in the water whereby no more lamps are activated than are necessary to irradiate the water in the channel.

* * * * *